(12) United States Patent
Miyatake et al.

(10) Patent No.: US 8,435,021 B2
(45) Date of Patent: May 7, 2013

(54) MOLD CLAMPING DEVICE

(75) Inventors: Tsutomu Miyatake, Kanagawa (JP); Norihito Okada, Chiba (JP); Shinji Terada, Kanagawa (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/360,008

(22) Filed: Jan. 27, 2012

(65) Prior Publication Data

US 2012/0269917 A1   Oct. 25, 2012

(30) Foreign Application Priority Data

Jan. 31, 2011   (JP) ................................ 2011-019094

(51) Int. Cl.
   *B29C 33/22*   (2006.01)
(52) U.S. Cl.
   USPC ............................... 425/3; 425/150; 425/595
(58) Field of Classification Search .............. 425/3, 150, 425/451.9, 595
   See application file for complete search history.

(56) References Cited

U.S. PATENT DOCUMENTS

| 5,322,430 | A | | 6/1994 | Kasai et al. |
| 5,352,394 | A | * | 10/1994 | Fujita et al. ...................... 425/3 |
| 5,912,020 | A | | 6/1999 | Grunitz |
| 2007/0158875 | A1 | * | 7/2007 | Tokui et al. .................... 425/595 |
| 2007/0264382 | A1 | * | 11/2007 | Tokui et al. ............... 425/450.1 |
| 2009/0324762 | A1 | * | 12/2009 | Moritani et al. .................. 425/3 |

FOREIGN PATENT DOCUMENTS

| JP | 05-237893 | | 9/1993 |
| JP | 08-169040 | | 7/1996 |
| JP | 10-044202 | | 2/1998 |
| JP | 10-151649 | * | 6/1998 |
| JP | 2005-342935 | | 12/2005 |
| JP | 2008-246932 | | 10/2008 |
| JP | 2010-131895 | | 6/2010 |

* cited by examiner

*Primary Examiner* — James Mackey
(74) *Attorney, Agent, or Firm* — IPUSA, PLLC

(57) ABSTRACT

A mold clamping device includes a first fixed member to which a stationary mold is to be attached; a first movable member to which a movable mold is to be attached; a second movable member configured to move together with the first movable member; a second fixed member provided between the first movable member and the second movable member; a mold clamping force generating mechanism configured to generate a mold clamping force due to an electromagnetic force between the second movable member and the second fixed member; and a mold clamping force amplifying mechanism configured to amplify the mold clamping force generated by the mold clamping force generating mechanism.

5 Claims, 5 Drawing Sheets

MOLD CLAMPING DEVICE

CROSS-REFERENCE TO RELATED APPLICATION

The present application is based upon and claims the benefit of priority of Japanese Patent Application No. 2011-019094, filed on Jan. 31, 2011, the entire contents of which are incorporated herein by reference.

BACKGROUND OF THE INVENTION

1. Field of the Invention

The present invention relates generally to a mold clamping device configured to generate a mold clamping force with the attraction force of an electromagnet, and more particularly to a mold clamping device configured to generate a greater mold clamping force by amplifying the mold clamping force.

2. Description of the Related Art

Conventional injection molding machines are known that have a mold clamping device that performs a mold clamping operation using the attraction of an electromagnet while performing a mold opening and closing operation using a ball screw. (See, for example, Japanese Laid-Open Patent Application No. 5-237893.)

Further, conventional injection molding machines are known that have a mold clamping device that performs a mold clamping operation using the attraction of an electromagnet while performing a mold opening and closing operation using a hydraulic cylinder. (See, for example, Japanese Laid-Open Patent Application No. 8-169040.)

SUMMARY OF THE INVENTION

According to an aspect of the invention, a mold clamping device includes a first fixed member to which a stationary mold is to be attached; a first movable member to which a movable mold is to be attached; a second movable member configured to move together with the first movable member; a second fixed member provided between the first movable member and the second movable member; a mold clamping force generating mechanism configured to generate a mold clamping force due to an electromagnetic force between the second movable member and the second fixed member; and a mold clamping force amplifying mechanism configured to amplify the mold clamping force generated by the mold clamping force generating mechanism.

The object and advantages of the embodiment will be realized and attained by means of the elements and combinations particularly pointed out in the claims.

It is to be understood that both the foregoing general description and the following detailed description are exemplary and explanatory and not restrictive of the invention as claimed.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENT

As described above, Japanese Laid-Open Patent Application No. 5-237893 and Japanese Laid-Open Patent Application No. 8-169040 describe mold clamping devices that perform a mold clamping operation using the attraction of an electromagnet. However, there is a problem in that the electromagnets for a molding clamping operation in Japanese Laid-Open Patent Application No. 5-237893 and Japanese Laid-Open Patent Application No. 8-169040 are capable of generating only a mold clamping force that is smaller than a mold clamping force generated by a toggle mechanism, and accordingly, are not applicable to mold clamping devices that need a greater mold clamping force.

According to an aspect of the present invention, a mold clamping device is provided that is configured to generate a greater mold clamping force by amplifying a mold clamping force due to the attraction of an electromagnet.

A description is given below of a mold clamping device according to an embodiment of the present invention.

Figure 1:
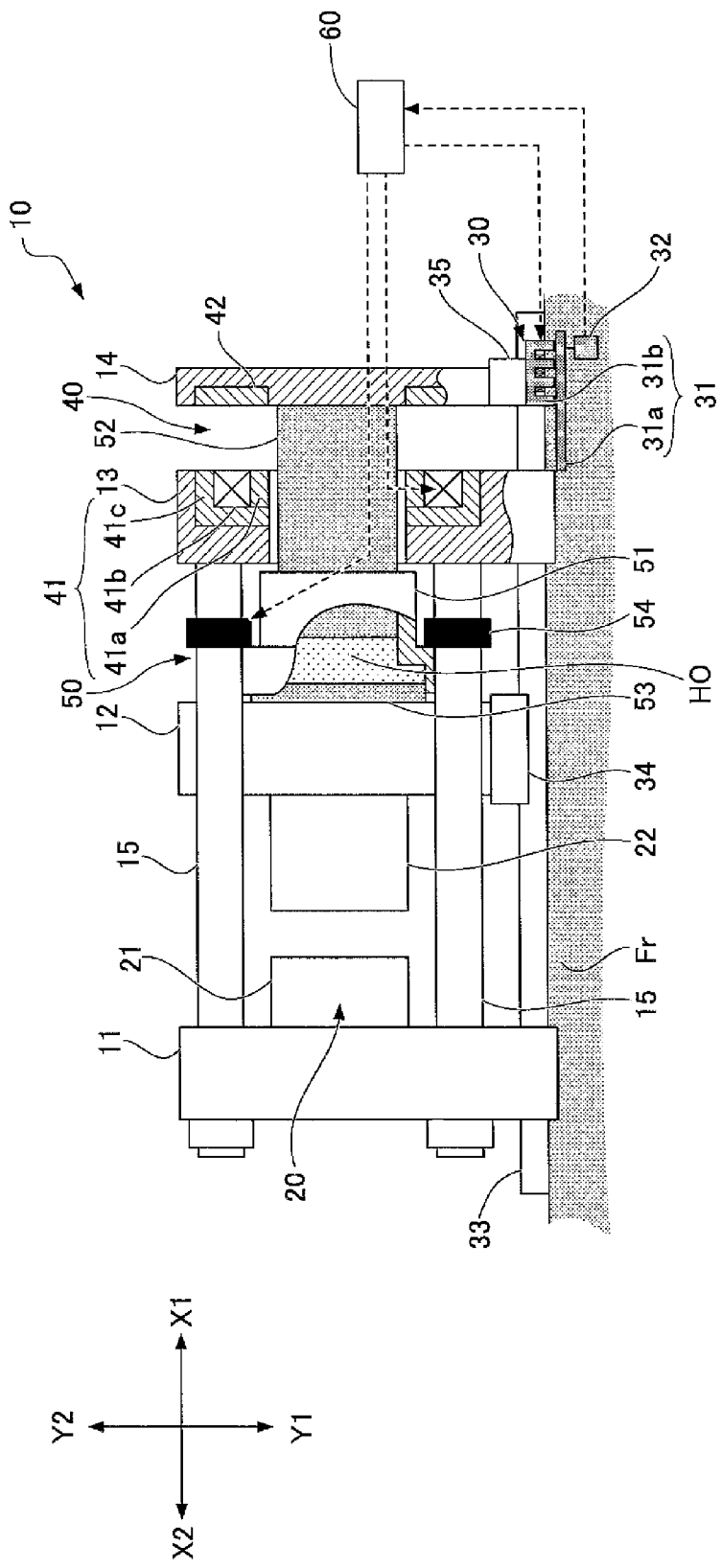
FIG. 1 is a partially cross-sectional side view of a mold clamping device in a mold open limit state according to an embodiment of the present invention.
Figure 2:
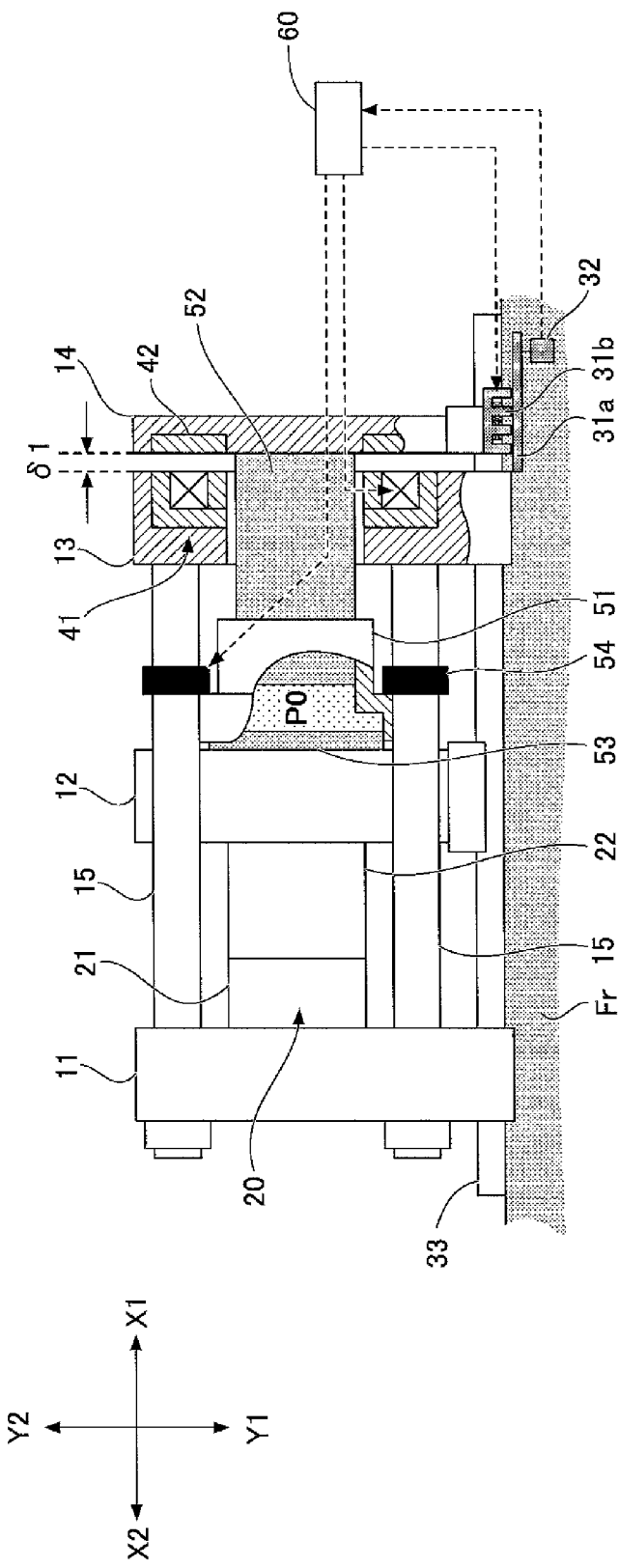
FIG. 2 is a partially cross-sectional side view of the mold clamping device in a mold closed limit state according to the embodiment of the present invention.
Figure 3:
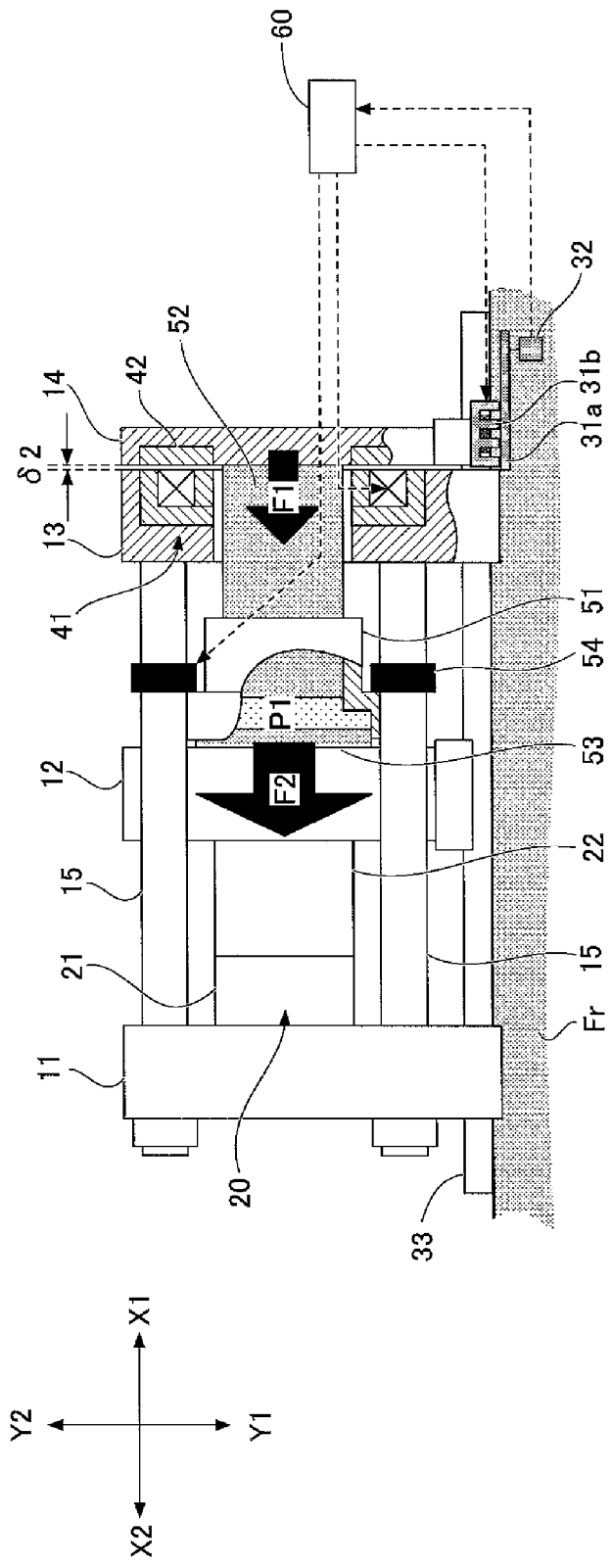
FIG. 3 is a partially cross-sectional side view of the mold clamping device at the time of mold clamping according to the embodiment of the present invention.

FIG. 1 is a partially cross-sectional side view of a mold clamping device 10 in a mold open limit state according to the embodiment of the present invention. FIG. 2 is a partially cross-sectional side view of the mold clamping device 10 in a mold closed limit (mold touched) state according to the embodiment of the present invention. FIG. 3 is a partially cross-sectional side view of the mold clamping device 10 at the time of mold clamping according to the embodiment of the present invention.

The mold clamping device 10 includes a stationary platen 11, a movable platen 12, a rear platen 13, an attraction plate 14, tie bars 15, a mold opening and closing mechanism 30, a mold clamping force generating mechanism 40, a mold clamping force amplifying mechanism 50, and a controller (control part) 60. A mold unit 20 is mounted on the mold clamping device 10.

The stationary platen 11 is a first fixed member fixed to a frame Fr. For example, a stationary mold 21 is attached to the X1-direction side surface of the stationary platen 11 in the drawings.

The movable platen 12 is a first movable member placed on two guide rails 33 (one of which is graphically illustrated), which are provided on the frame Fr, to be slidable in the X1 and the X2 direction. For example, a movable mold 22 is attached to the surface of the movable platen 12 on the side facing toward the stationary mold 21 attached to the stationary platen 11 (that is, the X2-direction side in the drawings).

For example, the movable platen 12 is fixed to a guide block 34 that travels on the guide rails 33, so that the movable platen 12 is slidable in the X1 and the X2 direction along the guide rails 33 together with the guide block 34.

The rear platen 13 (illustrated in a partially cross-sectional view) is a second fixed member fixed to the frame Fr like the stationary platen 11. For example, the rear platen 13 is placed on the frame Fr at a predetermined distance in the X1 direction from the stationary platen 11 with such a positional relationship as to allow the movable platen 12 to slide on the guide rails 33 between the stationary platen 11 and the rear platen 13.

The attraction plate 14 (illustrated in a partially cross-sectional view) is a second movable member that is, like the movable platen 12, placed on the two guide rails 33, which are provided on the frame Fr, to be slidable in the X1 and the X2 direction. For example, the attraction plate 14 is fixed to a guide block 35 that travels on the guide rails 33, so that the attraction plate 14 is slidable in the X1 and the X2 direction along the guide rails 33 together with the guide block 35.

The tie bars 15 are connecting members that connect the stationary platen 11 and the rear platen 13. For example, the tie bars 15 are formed of four bar-shaped members (two of which are graphically illustrated) that connect the four corners of the stationary platen 11 and the four corners of the rear platen 13 to each other.

The mold unit 20 is a device for creating a cavity space for receiving molten resin injected from an injection device (not graphically illustrated). The mold unit 20 includes the stationary mold 21 attached to the stationary platen 11 and the movable mold 22 attached to the movable platen 12.

The mold opening and closing mechanism 30 is a mechanism for opening and closing the mold unit 20 by moving the movable platen 12. The mold opening and closing mechanism 30 includes a linear motor 31, a mold open/closed state detecting sensor 32, the guide rails 33, the guide block 34, and the guide block 35.

The linear motor 31 includes a stator 31$a$ and a mover 31$b$. The stator 31$a$ has an elongated plate shape, and is provided on the frame Fr to be parallel to the guide rails 33. The mover 31$b$ is attached to the lower end (the Y1-direction side end) of the guide block 35, which is fixed to the lower end (the Y1-direction side end) of the attraction plate 14 and slides on the guide rails 33 together with the attraction plate 14, to face the stator 31$a$. The linear motor 31 is configured to generate a thrust to slide the attraction plate 14 and the movable plate 12, connected to the attraction plate 14 via the mold clamping force amplifying mechanism 50 described below, in the X1 and the X2 directions.

For example, the linear motor 31 is configured to cause the movable platen 12 and the attraction plate 14 to move in the X1 and the X2 direction by causing the mover 31$b$ to move in the X1 and the X2 direction relative to the stator 31$a$ using a repulsive force or an attraction force between the stator 31$a$, in the form of a permanent magnet array disposed to have north poles and south poles appearing alternately along the X1 and the X2 directions, and the mover 31$b$, in the form of an electromagnet array including multiple cores and multiple coils wound around the cores, the cores positioned at intervals corresponding to the intervals at which the magnetic poles are arranged in the permanent magnet array, and projecting vertically downward (in the Y1 direction).

The mold open/closed state detecting sensor 32 is a sensor for detecting the mold open state and the mold closed state of the mold unit 20. For example, the mold open/closed state detecting sensor 32 is a position sensor that, by detecting the position of the mover 31$b$ in the X1 and the X2 directions relative to the stator 31$a$ and outputting the detected value to the controller 60, enables the controller 60 to determine the position of the movable platen 12, the attraction plate 14, or the movable mold 22 and thereby to determine the mold open state or the mold closed state of the mold unit 20.

The guide rails 33 are rails for guiding the sliding movements of the guide blocks 34 and 35 in the X1 and the X2 directions.

The guide blocks 34 and 35 are members configured to slide on the guide rails 33. The guide blocks 34 and 35 are configured to support (carry) the movable platen 12 and the attraction plate 14, respectively, and to slide in the X1 and the X2 directions along with the movable platen 12 and the attraction plate 14 by receiving a thrust generated by the linear motor 31.

Based on the above-described configuration, the mold opening and closing mechanism 30 causes the movable platen 12 and the attraction plate 14 to slide along the guide rails 33 in the X2 direction, using a thrust in the X2 direction generated by the linear motor 31, to change the state of the mold clamping device 10 from the mold open limit state illustrated in FIG. 1 to the mold touched state illustrated in FIG. 2.

Further, the mold opening and closing mechanism 30 causes the movable platen 12 and the attraction plate 14 to slide along the guide rails 33 in the X1 direction, using a thrust in the X1 direction generated by the linear motor 31, to change the state of the mold clamping device 10 from the mold touched state illustrated in FIG. 2 to the mold open limit state illustrated in FIG. 1.

According to this embodiment, the linear motor 31 is attached to the lower end (the Y1-direction side end) of the attraction plate 14. However, the linear motor 31 may also be attached to the lower end (the Y1-direction side end) of the movable platen 12 or to the lower end (the Y1-direction side end) of each of the movable platen 12 and the attraction plate 14.

Further, according to this embodiment, the mold opening and closing mechanism 30 includes the linear motor 31. However, in place of the linear motor 31, the mold opening and closing mechanism 30 may include a rotary electric motor and a ball screw, or a hydraulic pump and a hydraulic cylinder.

The mold clamping force generating mechanism 40 is configured to generate a mold clamping force by attracting the attraction plate 14 to the rear platen 13. The mold clamping force generating mechanism 40 includes an electromagnet part 41 and an attraction part 42.

The electromagnet part 41 is a member configured to generate a magnetic force (attraction force). For example, the electromagnet part 41 includes a core 41$a$, a coil 41$b$, and a yoke 41$c$. In response to the coil 41$b$ wound around the core 41$a$ being fed with electric current, the electromagnet part 41 generates a magnetic force (attraction force), increases the magnetic force (attraction force) with the yoke 41$c$, and attracts the attraction plate 14 with the increased magnetic force (attraction force), thereby generating a mold clamping force.

The attraction part 42 is a member configured to be attracted to the magnetic force (attraction force) generated by the electromagnet part 41. The attraction part 42 is formed of, for example, a laminated electromagnetic steel plate.

For example, the mold clamping force generating mechanism 40 is configured to generate a mold clamping force by attracting the attraction part 42 embedded in the attraction plate 14 on the side facing toward the rear platen 13 (the X2-direction side) to the direction of the electromagnet part 41 (the X2 direction), so that the attraction plate 14 is attracted in the direction of the rear platen 13 (the X2 direction), in response to the coil 41$b$ of the electromagnet part 41 embedded in the rear platen 13 on the side facing toward the attraction plate 14 (the X1-direction side) being fed with electric current.

The mold clamping force generating mechanism 40 has the electromagnet part 41 embedded in the rear platen 13 and has the attraction part 42 embedded in the attraction plate 14. Alternatively, the mold clamping force generating mechanism 40 may also have the electromagnetic part 41 embedded in the attraction plate 14 and have the attraction part 42 embedded in the rear platen 13. Further, the mold clamping force generating mechanism 40 may also have the electromagnet part 41 embedded in each of the rear platen 13 and the attraction plate 14. In this case, the attraction part 42 may be so embedded in each of the rear platen 13 and the attraction plate 14 as to correspond to their respective electromagnet parts 41 or be omitted by so configuring the electromagnet parts 41 that the electromagnet parts 41 attract each other.

The mold clamping force generating mechanism 40 may have the electromagnet part 41 formed as a unit with the rear platen 13 or the attraction plate 14 or have the attraction part 42 formed as a unit with the attraction plate 14 or the rear platen 13.

Based on the above-described configuration, the mold clamping force generating mechanism 40 causes the attraction plate 14 and the movable platen 12 to slide along the guide rails 33 in the X2 direction, using the electromagnetic force (attraction force) generated by the electromagnet part 41, to change the state of the mold clamping device 10 from the mold touched state illustrated in FIG. 2 (where the distance between the rear platen 13 and the attraction plate 14 is δ1) to the state at the time of mold clamping illustrated in FIG. 3 (where the distance between the rear platen 13 and the attraction plate 14 is δ2 (<δ1)).

The mold clamping force amplifying mechanism 50 is configured to amplify the mold clamping force generated by the mold clamping force generating mechanism 50 and transmit the amplified mold clamping force to the movable platen 12. For example, the mold clamping force amplifying mechanism 50 includes a hydro pneumatic power-up part 51, a first rod part 52, a second rod part 53, and a reaction force receiving part 54.

The hydro pneumatic power-up part 51 (illustrated in a partially cross-sectional view) is a hydro pneumatic mechanism configured to amplify an input force. For example, the hydro pneumatic power-up part 51 is a hydro pneumatic cylinder that has two openings (an input-side opening and an output-side opening) different in area provided one at each end and is filled inside with working fluid HO (such as magnetic fluid, liquid [ethyl alcohol] or gas).

The first rod part 52 is a piston inserted in the input-side opening (the smaller one of the two openings) of the hydro pneumatic power-up part (hydro pneumatic cylinder) 51. For example, the first rod part 52 is in rigid connection to the attraction plate 14 to be slidable in the X1 and the X2 direction together with the attraction plate 14.

The second rod part 53 is a piston inserted in the output-side opening (the larger one of the two openings) of the hydra pneumatic power-up part (hydro pneumatic cylinder) 51. For example, the second rod part 53 is in rigid connection to the movable platen 12 to be slidable in the X1 and the X2 direction together with the movable platen 12.

The hydro pneumatic power-up part (hydro pneumatic cylinder) 51 may have one or both of the input-side opening and the output-side opening formed of a group of multiple openings as long as the total area of the output-side opening is greater than the total area of the input-side opening. In this case, a corresponding one or both of the pistons (the first rod part 52 and the second rod part 53) are fanned of a group of small pistons to be inserted into corresponding openings.

Further, the hydro pneumatic power-up part (hydro pneumatic cylinder) 51 has a stopper (not graphically illustrated) for preventing the piston from falling off provided at each of the input-side opening and the output-side opening, thereby preventing the first rod part 52 and the second rod part 53 from sliding inside the hydro pneumatic power-up part (hydro pneumatic cylinder) 51 more than required.

For example, the stoppers are implemented by the engagement of projecting parts projecting radially inward from the cylindrical interior wall surface of the hydro pneumatic power-up part (hydro pneumatic cylinder) 51 and groove parts formed on the exterior wall surfaces of the first rod part 52 and the second rod part 53. The stoppers prevent the first rod part 52 and the second rod part 53 from sliding beyond predetermined positions determined by the engagement inside the hydro pneumatic power-up part (hydro pneumatic cylinder) 51.

The reaction force receiving part 54 is a member configured to receive a reaction force against the hydro pneumatic power-up part (hydro pneumatic cylinder) 51 at the time of the hydro pneumatic power-up part (hydro pneumatic cylinder) 51 amplifying the mold clamping force generated by the mold clamping force generating mechanism 40.

For example, the reaction force receiving part 54 is in rigid connection to the hydro pneumatic power-up part (hydro pneumatic cylinder) 51 and is slidably attached to each of the four tie bars 15. The reaction force receiving part 54 is configured to be fixed to each of the four tie bars 15 to be non-slidably in accordance with a control signal fed from the controller 60 at the time of the hydra pneumatic power-up part (hydro pneumatic cylinder) 51 amplifying the mold clamping force generated by the mold clamping force generating mechanism 40.

For example, before generation of a mold clamping force by the mold clamping force generating mechanism 40, the reaction force receiving part 54 mechanically, electrically, or hydraulically fastens half nuts placed around each of the four tie bars 15 in accordance with a control signal fed from the controller 60, so as to cause a prevention force to be generated for preventing a relative movement between the hydro pneumatic power-up part (hydro pneumatic cylinder) 51, in rigid connection to the reaction force receiving part 54, and each of the four tie bars 15, thereby preventing the working fluid HO inside the hydro pneumatic power-up part (hydro pneumatic cylinder) 51, pressurized by the first rod part 52 caused to slide in the X2 direction by the mold clamping force generated by the mold clamping force generating mechanism 40, from pushing back the hydro pneumatic power-up part (hydro pneumatic cylinder) 51 in the X1 direction.

According to this embodiment, the reaction force receiving part 54 is configured to be fixed to each of the four tie bars 15 before generation of a mold clamping force by the molding clamping force generating mechanism 40. Alternatively, the reaction force receiving part 54 may also be configured to be fixed to one or some (two or three) of the four tie bars 15 before generation of a mold clamping force by the molding clamping force generating mechanism 40.

Further, the reaction force receiving part 54 may use any mechanisms other than half nuts as long as the mechanisms allow selective prevention of a relative movement between the hydro pneumatic power-up part (hydro pneumatic cylinder) 51, in rigid connection to the reaction force receiving part 54, and the tie bars 15.

Further, according to this embodiment, the reaction force receiving part 54 is allowed to be non-slidable relative to the tie bars 15 so as to prevent the hydro pneumatic power-up part (hydro pneumatic cylinder) 51 from being pushed back in the X1 direction at the time of amplifying a mold clamping force. The present invention, however, is not limited to this configuration.

For example, the reaction force receiving part 54 may be configured to be fixed to a fixed member other than the tie bars 15, such as the frame Fr, the stationary platen 11, the rear platen 13, or the guide rails 33, at the time of amplifying a mold clamping force. In this case, the tie bars 15 may be omitted.

The reaction force receiving part 54 may also be configured to be fixed to a member other than the tie bars 15, such as the movable platen 12, so as to maintain the positions of the hydro pneumatic power-up part (hydro pneumatic cylinder) 51, in rigid connection to the reaction force receiving part 54, and the second rod part 53 relative to each other at the time of the first rod part 52 sliding inside the hydro pneumatic power-up part (hydro pneumatic cylinder) 51 with the mold clamping force generated by the mold clamping force generating mechanism 40 (that is, at the time of amplifying the generated mold clamping force). In this case as well, the tie bars 15 may be omitted.

Based on the above-described configuration, as illustrated in FIG. 3, the mold clamping force amplifying mechanism 50 amplifies a mold clamping force in the X2 direction received by the second rod part 53 to a value F2 by increasing the pressure of the working fluid HO inside the hydro pneumatic power-up part (hydro pneumatic cylinder) 51 from a value P0 in the mold touched state illustrated in FIG. 2 to a value P1, in response to the first rod part 52 being pushed in the X2 direction inside the hydro pneumatic power-up part (hydro pneumatic cylinder) 51 by a mold clamping force F1 in the X2 direction based on the magnetic force (attraction force) generated by the electromagnet part 41.

For example, letting the pressure-receiving area of the first rod part 52 (the area of the input-side opening of the hydro pneumatic cylinder 51) be A1 and letting the pressure-receiving area of the second rod part 53 (the area of the output-side opening of the hydro pneumatic cylinder 51) be P2, the power-up ratio H is expressed by:

$$H = \frac{A_2}{A_1}.$$

Further, the reaction force received by the reaction force receiving part 54 is equal in magnitude to the mold clamping force F2 after the amplification. Further, in the case where the reaction force receiving part 54 is configured to be fixed to each of the four tie bars 15, the magnitude of the reaction force received by each of the four portions of the reaction force receiving part 54 is a quarter of the magnitude of the mold clamping force F2.

Figure 4:
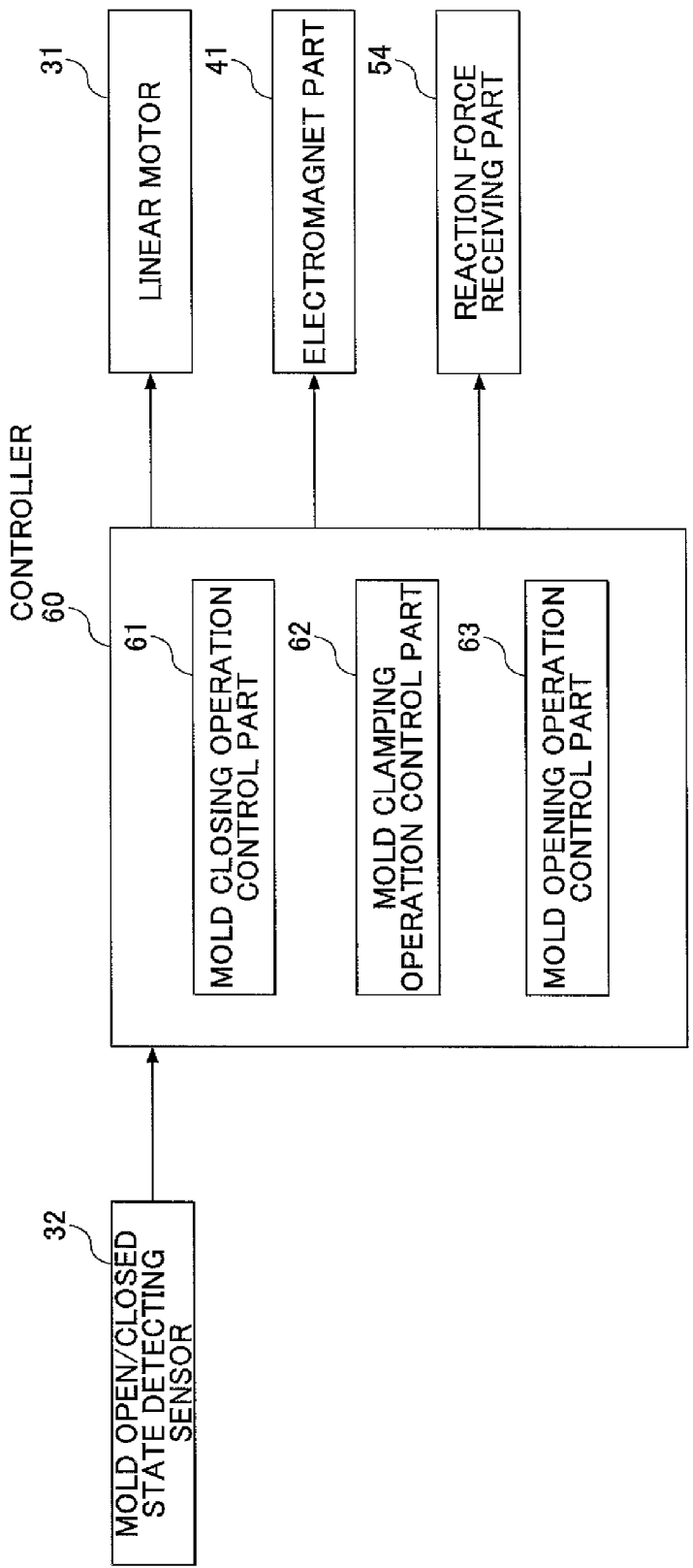
FIG. 4 is a functional block diagram illustrating a configuration of a controller according to the embodiment of the present invention.
Figure 5:
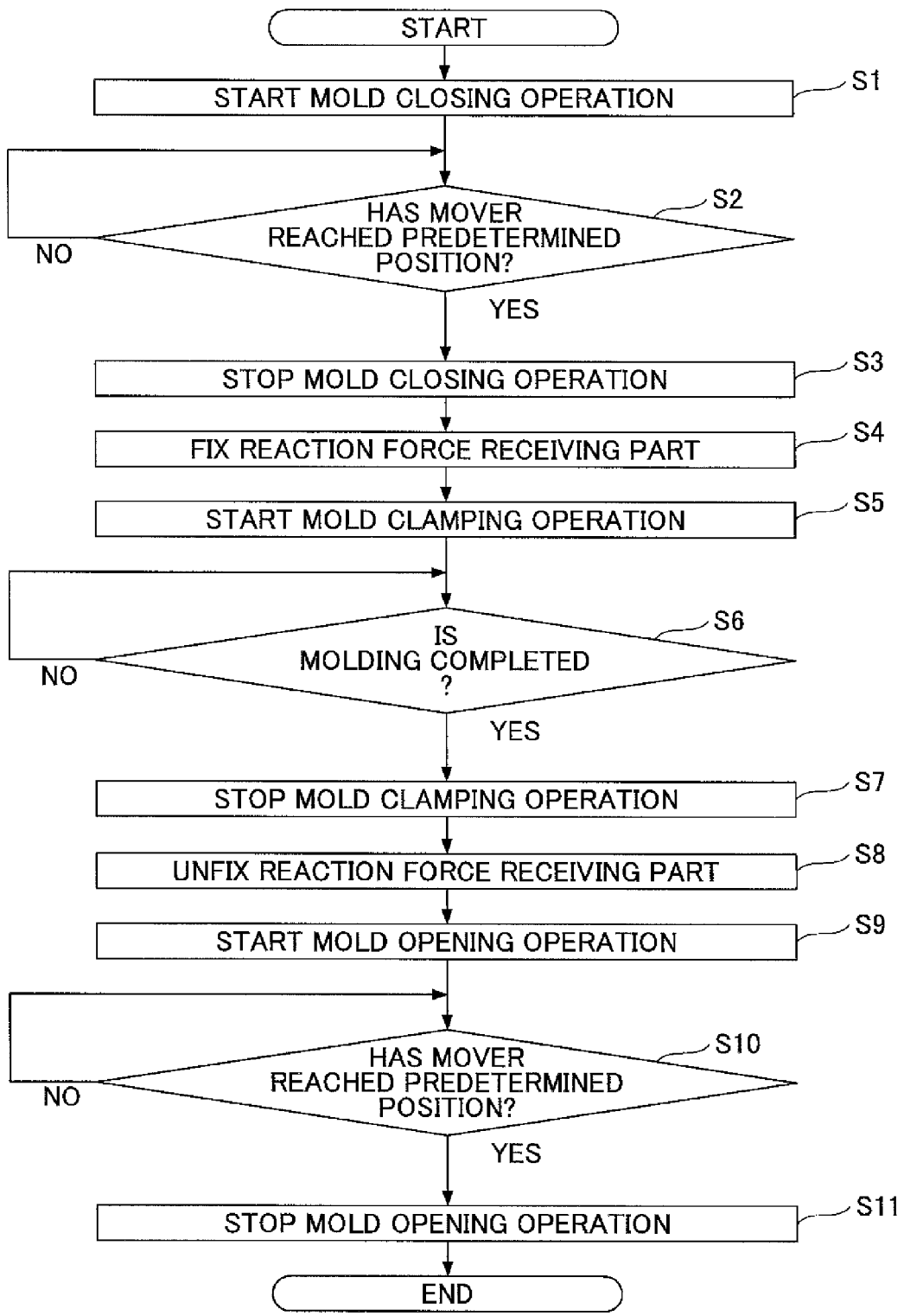
FIG. 5 is a flowchart illustrating a flow of a control process executed by the controller according to the embodiment of the present invention.

Next, a description is given, with reference to FIG. 4 and FIG. 5, of an operation of the controller 60. FIG. 4 is a functional block diagram illustrating a configuration of the controller 60. FIG. 5 is a flowchart illustrating a flow of a control process executed by the controller 60.

The controller 60 is a device configured to control the mold clamping device 10. For example, the controller 60 is a computer including a central processing unit (CPU), a random access memory (RAM), and a read-only memory (ROM). The controller 60 is configured to continuously obtain the output of the mold open/closed state detecting sensor 32 at predetermined intervals, to cause the CPU to execute processes corresponding to a mold closing operation control part 61, a mold clamping operation control part 62, and a mold opening operation control part 63 while reading programs corresponding to the mold closing operation control part 61, the mold clamping operation control part 62, and the mold opening operation control part 63 from the ROM and loading the programs into the RAM, and to output a control signal corresponding to the results of the processes to the linear motor 31 of the mold opening and closing mechanism 30, the electromagnet part 41 of the mold clamping force generating mechanism 40, or the reaction force receiving part 54 of the mold clamping force amplifying mechanism 50.

Referring to FIG. 5, first, in step S1, the controller 60 installed in the mold clamping device 10 in the mold open limit state (FIG. 1) causes the mold closing operation control part 61 to start a mold closing operation in response to a predetermined event such as an operator's operation input via an input device (not graphically illustrated).

For example, the controller 60 causes the mold closing operation control part 61 to output a control signal to the linear motor 31 of the mold opening and closing mechanism 30, and causes the movable platen 12, the rear platen 13, the attraction plate 14, the movable mold 22, and the mold clamping force amplifying mechanism 50 to slide as a unit in the X2 direction with a thrust in the X2 direction generated by the linear motor 31 in response to the control signal.

Further, the reaction force receiving part 54 also slides on each of the four tie bars 15 together with the hydro pneumatic power-up part (hydro pneumatic cylinder) 51.

In step S2, the controller 60 determines whether the mover 31b has reached a predetermined position by monitoring the position of the mover 31b relative to the stator 31a by causing the mold closing operation control part 61 to continuously obtain the output of the mold open/closed state detecting sensor 32 at predetermined intervals during this mold closing operation.

If the controller 60 determines that the mover has not yet reached the predetermined position (NO in step S2), the controller 60 causes the mold closing operation to continue. If the controller 60 determines that the mover 31b has reached the predetermined position (YES in step S2), in step S3, the controller 60 causes the mold closing operation to stop.

At this point, the mold clamping device 10 is in the mold touched state (FIG. 2), and in step S4, the controller 60 causes the mold clamping operation control part 62 to output a control signal to the reaction force receiving part 54, and causes the reaction force receiving part 54 to be fixed to each of the four tie bars 15 so that the reaction force receiving part 54 is prevented from sliding.

Thereafter, in step S5, the controller 60 causes the mold clamping operation control part 62 to start a mold clamping operation by causing the mold clamping operation control part 62 to output a control signal to the electromagnet part 41 of the mold clamping force generating mechanism 40, causing the mold clamping force F1 (FIG. 3) to be generated with a magnetic force (attraction force) generated by the electromagnet 41 in response to the control signal, causing the mold clamping force F1 to be amplified to the mold clamping force F2 (FIG. 3) using the hydro pneumatic power-up part (hydro pneumatic cylinder) 51 of the mold clamping force amplifying mechanism 50, and causing the movable mold 22 to be pressed against the stationary mold 21 with the mold clamping force F2 after the amplification.

In step S6, the controller 60 determines if molding is completed (if a molded article is sufficiently cooled) by starting to measure elapsed time after completion of injection in response to receiving a control signal (reporting completion of injection) from an injection device (not graphically illustrated) through the mold clamping operation control part 62; and monitoring whether the elapsed time has reached a predetermined time.

If the controller 60 determines that molding is not completed (NO in step S6), the controller 60 causes the mold clamping operation to continue. If the controller 60 determines that molding is completed (YES in step S6), in step S7, the controller 60 causes the mold clamping operation to stop.

For example, the controller 60 causes the mold clamping force F1 in the X2 direction to disappear by causing the magnetic force (attraction force) generated by the electromagnet part 41 of the mold clamping force generating mechanism 40 to disappear by causing the mold clamping operation control part 62 to output a control signal to the electromagnet part 41.

As a result, the first rod part 52 is pushed back in the X1 direction by the pressure (of the value P1) of the working fluid HO inside the hydro pneumatic power-up part (hydro pneumatic cylinder) 51 to cause the attraction plate 14 to slightly slide in the X1 direction.

At this point, the working fluid HO inside the hydro pneumatic power-up part (hydro pneumatic cylinder) 51 expands in volume to reduce its pressure from the value P1 to the value P0, so that the mold clamping force F2 after the amplification disappears.

At this point, the mold clamping device 10 is in the mold touched state (FIG. 2), and in step S8, the controller 60 causes the mold clamping operation control part 62 to output a control signal to the reaction force receiving part 54, and causes the reaction force receiving part 54 to be unfixed from each of the four tie bars 15, so that the reaction force receiving part 54 is again slidable relative to each the four tie bars 15.

Thereafter, in step S9, the controller 60 causes the mold opening operation control part 63 to start a mold opening operation.

For example, like in the mold closing operation, the controller 60 causes the mold opening operation control part 63 to output a control signal to the linear motor 31 of the mold opening and closing mechanism 30, and causes the movable platen 12, the rear platen 13, the attraction plate 14, the movable mold 22, and the mold clamping force amplifying mechanism 50 to slide as a unit in the X1 direction with a thrust in the X1 direction generated by the linear motor 31 in response to the control signal.

Further, the reaction force receiving part 54 also slides on each of the four tie bars 15 together with the hydro pneumatic power-up part (hydro pneumatic cylinder) 51.

In step S10, the controller 60 determines whether the mover 31b has reached a predetermined position by monitoring the position of the mover 31b relative to the stator 31a by causing the mold opening operation control part 63 to continuously obtain the output of the mold open/closed state detecting sensor 32 at predetermined intervals during this mold opening operation.

If the controller 60 determines that the mover has not yet reached the predetermined position (NO in step S10), the controller 60 causes the mold opening operation to continue. If the controller 60 determines that the mover 31b has reached the predetermined position (YES in step S10), in step S11, the controller 60 causes the mold opening operation to stop.

At this point, the mold clamping device 10 is in the mold open limit state (FIG. 1), and the controller 60 is ready to cause the next mold closing operation to start.

The above-described configuration makes it possible for the mold clamping device 10 to amplify the mold clamping force F1 generated by the electromagnet part 41 of the mold clamping force generating mechanism 40 using the hydro pneumatic power-up part (hydro pneumatic cylinder) 51 of the mold clamping force amplifying mechanism 50 and to generate the greater mold clamping force F2.

Further, it is possible for the mold clamping device 10 to prevent the hydro pneumatic power-up part (hydro pneumatic cylinder) 51 from being pushed back by an increase in the pressure of the working fluid inside the hydro pneumatic power-up part 51 and to ensure transmission of the mold clamping force F2 to the movable platen 12, using the reaction force receiving part 54.

All examples and conditional language recited herein are intended for pedagogical purposes to aid the reader in understanding the invention and the concepts contributed by the inventors to furthering the art, and are to be construed as being without limitation to such specifically recited examples and conditions, nor does the organization of such examples in the specification relate to a showing of the superiority or inferiority of the invention. Although the embodiments of the present inventions has been described in detail, it should be understood that various changes, substitutions, and alterations could be made hereto without departing from the spirit and scope of the invention. For example, in the above-described embodiment, the mold clamping device 10 may be configured to have a cavity through the center portions of the hydro pneumatic power-up part (hydro pneumatic cylinder) 51, the first rod part 52, and the second rod part 53 and to have an ejector device (not graphically illustrated) placed in the cavity to be connected to the movable platen 12.

What is claimed is:
1. A mold clamping device, comprising:
   a first fixed member to which a stationary mold is to be attached;
   a first movable member to which a movable mold is to be attached;
   a second movable member configured to move together with the first movable member;
   a second fixed member provided between the first movable member and the second movable member;
   a mold clamping force generating mechanism configured to generate a mold clamping force due to an electromagnetic force between the second movable member and the second fixed member; and
   a mold clamping force amplifying mechanism configured to amplify the mold clamping force generated by the mold clamping force generating mechanism.
2. The mold clamping device as claimed in claim 1, wherein the mold clamping force amplifying mechanism includes:
   a hydro pneumatic cylinder including a first piston including a first pressure-receiving area and a second piston including a second pressure-receiving area different from the first pressure-receiving area; and
   a reaction force receiving part configured to receive a reaction force against the hydro pneumatic cylinder at a time of amplifying the mold clamping force generated by the mold clamping force generating mechanism.
3. The mold clamping device as claimed in claim 2, wherein:
   the first piston is connected to the second movable member,
   the second piston is connected to the first movable member, and
   the second pressure-receiving area of the second piston is greater than the first pressure-receiving area of the first piston.
4. The mold clamping device as claimed in claim 2, further comprising:
   a connecting member configured to connect the first fixed member and the second fixed member,
   wherein the reaction force receiving part is slidably attached to the connecting member, and is configured to receive the reaction force against the hydro pneumatic cylinder by being fixed to the connecting member at the time of amplifying the mold clamping force generated by the mold clamping force generating mechanism.

5. The mold clamping device as claimed in claim 4, further comprising:
- a linear motor including a stator and a mover, the mover being fixed to the second movable member to move together with the second movable member;
- a sensor configured to detect a position of the mover relative to the stator; and
- a control part configured to output a control signal to the reaction force receiving part in response to determining, based on an output of the sensor, that the mover is at a predetermined position,
- wherein the reaction force receiving part is configured to be fixed to the connecting member in response to the control signal from the control part.

* * * * *